Jan. 17, 1950     R. P. PALMER     2,494,718
METHOD OF ELECTRIC ARC WELDING
Filed June 15, 1948     2 Sheets-Sheet 1

INVENTOR
Robert P. Palmer
by Stebbins, Blenko & Webb
Attys.

Jan. 17, 1950 R. P. PALMER 2,494,718
METHOD OF ELECTRIC ARC WELDING
Filed June 15, 1948 2 Sheets-Sheet 2

INVENTOR
Robert P. Palmer

Patented Jan. 17, 1950

2,494,718

UNITED STATES PATENT OFFICE 2,494,718

METHOD OF ELECTRIC ARC WELDING

Robert P. Palmer, Steubenville, Ohio

Application June 15, 1948, Serial No. 33,029

6 Claims. (Cl. 219—10)

This invention relates to a method of welding in which a weld rod is laid along a desired line of weld on a workpiece, the weld rod being connected to one lead of an electric circuit, the workpiece being connected to the other lead of an electric circuit, the workpiece being insulated from the electrode, an arc is struck at one end of the weld rod and the arc progresses from end to end of the weld rod.

In the accompanying drawings which illustrate two preferred embodiments of my invention—

Various welding methods in which a weld rod is laid along the desired line of weld and the arc progresses from end to end of the weld rod have been employed but each of them has certain disadvantages which are overcome according to the present method. In one prior known method one lead of an electric circuit was connected to the workpiece and the other lead of the electric circuit was connected to one end of the weld rod. An arc was struck at the opposite end of the weld rod and progressed throughout its length. An objection to this method is that throughout the welding operation, all of the electric current is supplied to the weld rod at one end of the weld rod. This method is satisfactory for short welds but where the weld is to be a long one, it is unsatisfactory because if enough current is supplied to the weld rod to maintain the arc, the weld rod heats up to such an extent that it moves out of line and may become so hot as to melt the weld rod at a point in advance of the arc, thus stopping the welding operation.

In another prior known method a bus bar is located above and spaced from the weld rod and workpiece. A series of electric contacts extend down from the bus bar and make contact with the weld rod at spaced points along its length. While this method is an improvement over that first described, in that current is supplied at spaced points to the weld rod by the contacts connected to the bus bar instead of all the current being supplied to one end of the weld rod, it still is objectionable because current is supplied over the entire length of the weld rod. In other words, current flows through the entire length of the weld rod and if the current supplied is too great it causes the weld rod to warp out of the desired line of weld.

A still further prior known method is to provide a sliding electrical contact between a source of electric current and the weld rod. In this method the contact is advanced ahead of the arc, thereby limiting the heating of the weld rod to that portion adjacent the arc, but the employment of a sliding contact is intricate and objectionable. In carrying out any of these processes it is preferable to cover the weld rod with granular material such as silica sand or any other material which excludes oxygen of the air from the weld. The employment of a sliding contact is not feasible in connection with such granular material for excluding oxygen, since the granular material becomes lodged between the sliding contact and the weld rod and causes arcing and short circuiting at the contact.

Figure 1:
Figure 1 is a side elevation of a weld rod and Figure 2 is an end view.
Figure 2:
Figure 3:
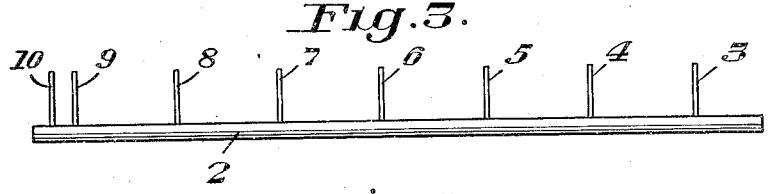
Figure 3 is a side elevation of the weld rod with pins connected thereto and Figure 4 is an end view thereof.
Figure 4:
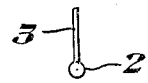
Figure 5:
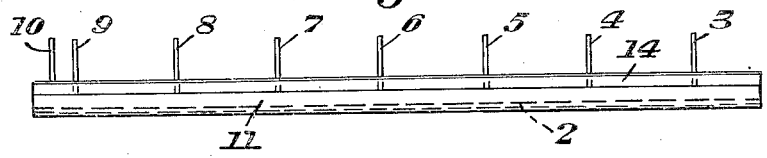
Figure 5 is a side elevation of the weld rod with pins connected thereto, assembled with two workpieces to be welded and means for insulating the weld rod from the workpieces.
Figure 6:
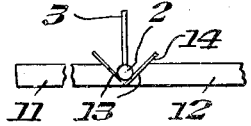
Figure 6 is an end elevation of the assembly shown in Figure 5.

The present invention overcomes the various disadvantages of the prior known methods. Referring more particularly to the accompanying drawings, the usual steel or other weld rod 2, as shown in Figures 1 and 2, may be employed. The weld rod is provided throughout its length with spaced steel pins 3, 4, 5, 6, 7, 8, 9 and 10, which are welded to the weld rod 2. In the embodiment shown in the drawings, it is desired to weld together two workpieces 11 and 12, each provided with a beveled edge 13 forming a V-shaped notch. A sheet of insulating material, such for example as asbestos paper 14, is placed in the notch and the weld rod 2 with its pins is placed in the notch over the insulation. Silica sand 15 or other oxygen-excluding granular material is heaped over the weld rod, and the workpiece 11 is connected to one lead 16 of an electric circuit. The other lead 17 of the electric circuit is provided with two branches 18 and 19, the lead 18 having at its end a current-supplying contact or holder 20 and the lead 19 having a current-supplying contact 21.

Figure 7:
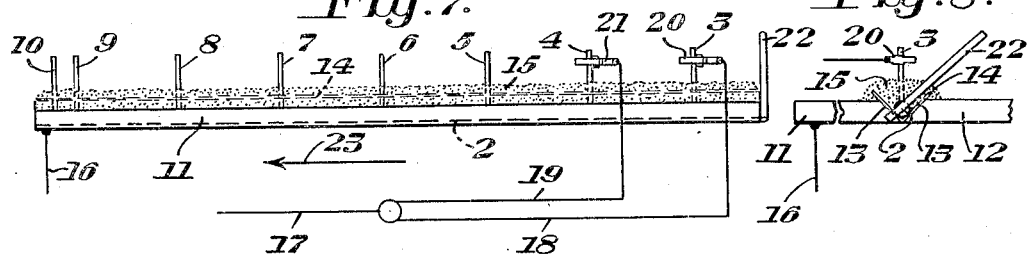
Figures 7 and 8 are a side elevation and an end view respectively illustrating the first stage of the actual welding operation, in which current-supplying contacts are connected to certain of the pins.
Figure 8:
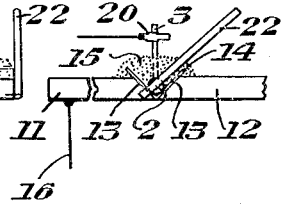
Figure 9:
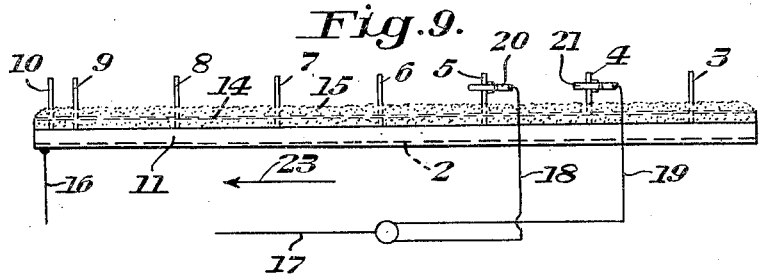
Figure 9 and 10 illustrate further stages in the welding operation, Figure 9 representing an intermediate stage and Figure 10 the final stage.
Figure 10:
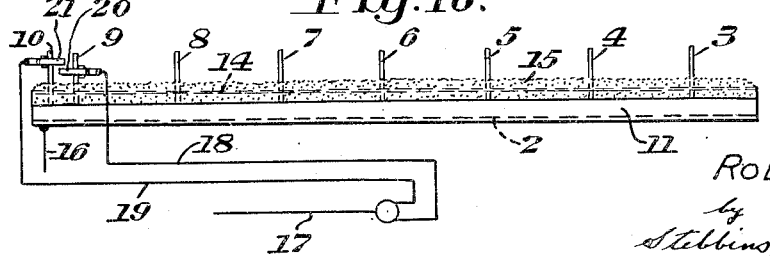

In starting the welding operation the contact 20 is applied to the pin 3 and the contact 21 to the pin 4. An arc is struck between the ends of the weld rod and workpiece by a metal or carbon rod 22, the arc being struck at that end of the weld rod which is adjacent to the pins 3 and 4 to which the current-supplying contacts are connected. The arc progresses from right to left, as shown in Figure 7, and as indicated by the arrow 23. Various progressive stages of the welding operation are illustrated in Figures 7 and 8, 9 and 10. As the arc progresses to the first pin 3, the contact 20 is removed from that pin and advanced to the pin 5 as shown in Figure 9. In a similar manner when the arc progresses to pin 4, the contact 21 is removed from that pin and replaced on pin 6. The process is continued in this manner, moving each of the contacts 20 and 21 in a step-by-step manner as the arc progresses to each pin until the arc has progressed the entire length of the weld rod and the contacts 20 and 21 are on the pins 9 and 10, respectively.

It will be seen that in carrying out my method the contacts 20 and 21 at the beginning of the welding operation are applied only to those pins which lie adjacent one end of the weld rod. Thus at this stage of the operation current is supplied only to the end portion of the weld rod so that the remainder of the weld rod is not heated unduly and does not warp out of the desired line of weld. As the arc progresses from right to left, the contacts are moved in a step-by-step manner by removing a contact from one pin and replacing it on another pin which is located adjacent the region of the arc. Accordingly, the current is supplied to the weld rod uninterruptedly throughout the entire welding operation. It will be noted that the current is supplied at any one time only to that portion of the weld rod which is adjacent the arc. The provision of a plurality of contacts enables a relatively large current to be supplied to the weld rod. If all of the current which in the embodiment shown is supplied by the two branches 18 and 19, was supplied through a single lead, it might cause the pin to burn off and the welding operation to stop. The present arrangement allows a large current to be supplied to the weld rod but because the current is supplied only to that portion of the weld rod which is adjacent the arc, the remainder of the weld rod does not become overheated and warp out of the desired line of weld.

In carrying out my invention the pins connected to the weld rod should not be spaced too far apart since that will cause overheating and warping of the weld rod. In the embodiments which are illustrated herein, the spacing of the pins is about 14". I have also found that a spacing of 24" between pins is satisfactory, but a space of 36" has been found to be too great.

Figure 11:
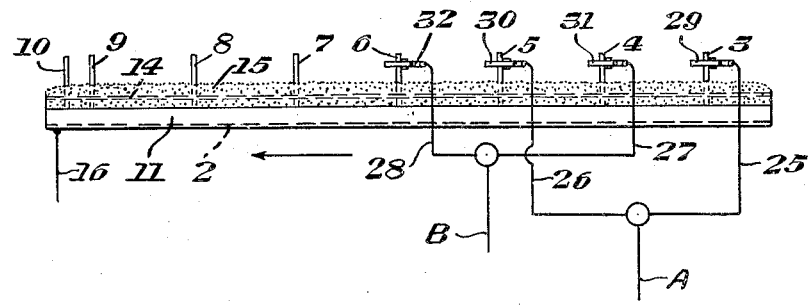
Figures 11, 12 and 13 illustrate successive stages in a different embodiment of the invention in which two welding lines each having two current-supplying contacts are employed.
Figure 12:
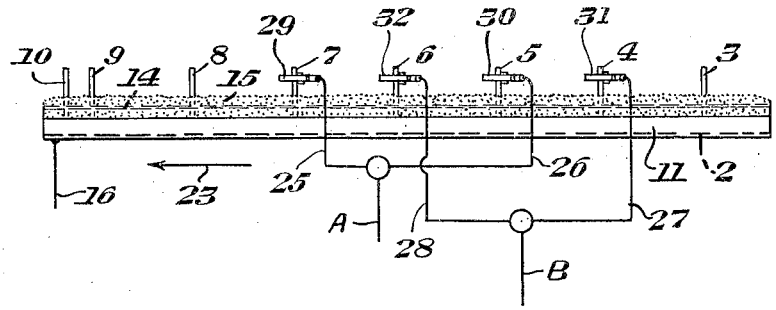
Figure 13:
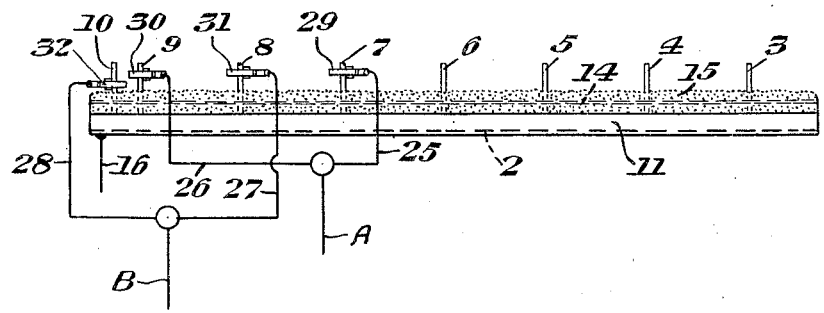

In the method illustrated in Figures 1–10, two current-supplying contacts 20 and 21 are shown. This arrangement has proved satisfactory where small weld rods, say up to ½" in diameter, are employed with electric current up to about 600 amperes. Where larger diameter weld rods, say ¾" diameter rods, are used with electric current at 2400 amperes or 1¼" diameter rods are used with 3600 amperes, it is preferred to employ two welding lines, each welding line having two current-supplying contacts as shown in Figures 11–13. Of course, more than two welding lines can be employed if desired.

Referring to Figures 11–13, two welding lines A and B are employed, the welding line A having two branches 25 and 26 and the line B having two branches 27 and 28. The branch 25 has a current-supplying contact 29, branch 26 a contact 30, branch 27 a contact 31 and branch 28 a contact 32. Figures 11, 12 and 13 show progressive stages of the welding operation, certain intermediate stages being omitted. When the arc has progressed to the pin 3 the contact 29 is removed from that pin and replaced on pin 7, as shown in Figure 12. As the arc progresses to each pin, its contact is removed from the pin and placed on a pin in advance of the arc but in the same general area as the arc. The same general advantages are obtained by employing the two welding lines A and B as shown in Figures 11–13 as are obtained with the arrangement shown in Figures 1–10. The arrangement shown in Figures 11–13, of course, has the added advantage of enabling the use of higher currents without causing the weld rod to warp out of the desired line of weld.

The invention is not limited to the embodiments which have been shown merely for purposes of illustration but may be otherwise embodied or practiced within the scope of the following claims.

I claim:

1. A method of welding a workpiece, comprising laying a weld rod along a desired line of weld upon a workpiece of metal which conducts electricity but insulated therefrom, connecting the weld rod and workpiece in an electric circuit and striking an arc between the weld rod and workpiece, applying current to the weld rod at a plurality of spaced points while confining the application of current to the portion of the weld rod which lies adjacent the arc, and as the arc progresses to each point of current supply stopping the supply of current at that point and reapplying the same current supply to another point on the weld rod located adjacent to but in advance of the arc, whereby the current is supplied to the weld rod uninterruptedly throughout the welding operation and the current is supplied at any one time only to that portion of the weld rod which is adjacent the arc.

2. A method of welding a workpiece of metal which conducts electricity comprising laying along a desired line of weld a weld rod having a plurality of pins integral therewith and spaced throughout the length of the weld to be laid, providing insulation between said weld rod and workpiece, connecting the weld rod and workpiece in an electric circuit and striking an arc between the weld rod and workpiece, applying a plurality of current-supplying contacts only to those pins which lie adjacent the arc, and as the arc progresses to each pin removing the current-supplying contact connected to it and applying it to a pin located adjacent to but in advance of the arc, whereby the current is supplied to the weld rod uninterruptedly throughout the welding operation and the current is supplied at any one time only to that portion of the weld rod which is adjacent the arc.

3. A method of welding a workpiece of metal which conducts electricity comprising laying along a desired line of weld a weld rod having a plurality of pins integral therewith and spaced throughout the length of the weld to be laid, providing insulation between said weld rod and workpiece, the pins extending upwardly from the weld rod, covering the weld rod with granular oxygen excluding material while leaving the ends of the pins exposed, connecting the weld rod and workpiece in an electric circuit and striking an arc between the weld rod and workpiece, applying a plurality of current-supplying contacts only to those pins which lie adjacent the arc, and as the arc progresses to each pin removing the current-supplying contact connected to it and applying it to a pin located adjacent to but in advance of the arc, whereby the current is supplied to the weld rod uninterruptedly throughout the welding operation and the current is supplied at any one time only to that portion of the weld rod which is adjacent the arc.

4. A method of welding a workpiece of metal which conducts electricity comprising laying along a desired line of weld a weld rod having a plurality of pins integral therewith and spaced throughout the length of the weld to be laid, providing insulation between said weld rod and workpiece, connecting the weld rod and workpiece in an electric circuit and striking an arc between the weld rod and workpiece, applying a plurality of current-supplying contacts only to those pins which lie adjacent the arc, and as the arc progresses along the line of weld, removing the current-supplying contacts singly and successively in a step-by-step manner and re-applying them singly and successively to pins located adjacent to but in advance of the arc, whereby the current is supplied to the weld rod uninterruptedly throughout the welding operation and the current is supplied at any one time only to that portion of the weld rod which is adjacent the arc.

5. A method of welding a workpiece of metal which conducts electricity comprising laying along a desired line of weld a weld rod having a plurality of pins integral therewith and spaced throughout the length of the weld to be laid, providing insulation between said weld rod and workpiece, the pins extending upwardly from the weld rod, covering the weld rod with granular oxygen-excluding material while leaving the ends of the pins exposed, connecting the weld rod and workpiece in an electric circuit and striking an arc between the weld rod and workpiece, applying a plurality of current-supplying contacts only to those pins which lie adjacent the arc, and as the arc progresses along the line of weld to each pin removing the current-supplying contacts singly and successively in a step-by-step manner and re-applying them singly and successively to pins located adjacent to but in advance of the arc, whereby the current is supplied to the weld rod uninterruptedly throughout the welding operation and the current is supplied at any one time only to that portion of the weld rod which is adjacent the arc.

6. A method of welding a workpiece of metal which conducts electricity, comprising laying a weld rod upon a desired line of weld and insulated from the workpiece, contacting the weld rod at a plurality of spaced points and supplying current through said contacts, and as the weld progresses to a contact, removing that contact and making another contact with it at a point more remote from the arc, whereby the number of contacts with the weld rod remains constant substantially throughout the welding operation.

ROBERT P. PALMER.

REFERENCES CITED

The following references are of record in the file of this patent:

UNITED STATES PATENTS

| Number | Name | Date |
|---|---|---|
| 1,954,773 | Champion et al. | Apr. 10, 1934 |
| 1,965,079 | Hopkins | July 3, 1934 |
| 2,220,576 | MacKusick | Nov. 5, 1940 |
| 2,402,165 | Kinkead | June 18, 1946 |